United States Patent [19]

Clark

[11] Patent Number: 4,617,642
[45] Date of Patent: Oct. 14, 1986

[54] SELECT SWITCH RESPONSIVE TO A BREAK CODE

[75] Inventor: Jeffrey S. Clark, Raleigh, N.C.

[73] Assignee: Data General Corporation, Westboro, Mass.

[21] Appl. No.: 375,245

[22] Filed: May 6, 1982

[51] Int. Cl.[4] ............................. G06F 7/00; H04Q 9/00
[52] U.S. Cl. ............................. 364/900; 340/825.89
[58] Field of Search ............ 371/20, 15; 364/580,
364/200 MS File, 900 MS File; 324/73 AT, 73 R; 340/825.08, 825.22, 825.89

[56] References Cited

U.S. PATENT DOCUMENTS

| 4,076,970 | 2/1978 | Lubarsky, Jr. et al. | 179/175.2 |
| 4,307,454 | 12/1981 | Haben | 364/900 |
| 4,345,251 | 8/1982 | Begeman et al. | 340/825.86 |
| 4,380,731 | 4/1983 | Alker | 324/51 |
| 4,397,021 | 8/1983 | Lloyd et al. | 371/580 |
| 4,402,055 | 8/1983 | Lloyd et al. | 364/579 |
| 4,488,299 | 12/1984 | Fellhauer et al. | 371/20 |
| 4,495,622 | 1/1985 | Charruau | 371/20 |
| 4,502,127 | 2/1985 | Garcia et al. | 364/900 |

Primary Examiner—Eddie P. Chan

[57] ABSTRACT

Apparatus whereby a single component of electrical apparatus may be disconnected from one of a group of components and connected to another of the group in response to a break code. The apparatus includes a break code detector which generates a select signal in response to a break code and switching means which respond to the select signal by disconnecting the single component from one of the group of components and connecting it to another of the group. The apparatus may also include a display responsive to break codes for showing which component of the group is currently connected to the single component. In embodiments in apparatus having break codes consisting of a sequence of one state longer than that found in any other digital code, the break code detector includes apparatus for measuring intervals between occurrences of the state other than that making up the break code and thereby detecting break codes.

4 Claims, 7 Drawing Figures

SELECT SWITCH RESPONSIVE TO A BREAK CODE

BACKGROUND OF THE INVENTION

1. Field of the Invention

The present invention relates generally to switch means used in digital computer systems for connecting components of the system to each other, and more specifically to switch means which allow a user of an input device to select one of a plurality of CPUs.

2. Description of Prior Art

In many circumstances arising during the manufacture, testing, and use of digital data processing systems, it is advantageous to be able to connect a single component of the system to one of a set of other components. For example, when testing CPUs, it is useful to be able to connect a single input or input-output device such as a terminal to more than one CPU. In the prior art, components have been connected by means of a patch panel: lines from the set of components are connected to sockets in the patch panel and a line from the single component is plugged into the socket for one of the set of components.

The patch panel is at best cumbersome, since the user of the single component must leave the component in order to switch to another of the set of components. At worst, the patch panel can be a major hindrance. For example, when a single terminal is used to test a set of CPUs, it is often necessary to switch frequently between CPUs, but not convenient to locate the patch panel near the terminal. Under such circumstances each switch between CPUs requires a long trip to the patch panel. In such an application, alternatives to the patch panel are complicated and expensive. For example, the terminal may be connected to each CPU by means of a relay and there may be means at the terminal for controlling the relays. By turning the relays on and off from the terminal, the user at the terminal can connect his terminal to a different CPU without going to a patch panel. However, the terminal must be provided with a means for controlling the relays and connections must be provided between that means and the relays themselves.

SUMMARY OF THE INVENTION

The present invention solves the above-mentioned problems of the prior art by providing apparatus which switches a single component of electrical apparatus among components belonging to a set of components in response to the break code used in digital data processing to indicate a break in a stream of data codes. The apparatus consists of a source of a break code, a detector for detecting the break code and providing a select signal, and switching apparatus responsive to the select signal for disconnecting the single component from one of the set of components and connecting it to another component of the set of components.

It is thus an object of the present invention to provide an improved digital data processing system.

It is another object of the present invention to provide apparatus responsive to a break code for connecting a single component of a digital data processing system to one of a set of components.

It is yet another object of the present invention to provide an improved means for switching a single terminal among a group of CPUs.

It is another object of the present invention to provide a means for switching a single terminal among a group of CPUs which may be activated from the terminal and which requires no additional connections between the terminal and the group of CPUs.

It is a further object of the present invention to provide a means for switching a single terminal among a group of CPUs which may be activated by striking the break key.

It is a still further object of the present invention to provide such a switching means which includes means for indicating which CPU is presently connected to the terminal.

It is yet another object of the present invention to provide an inexpensive means for detecting a break code.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 1A is a block diagram of a digital computer system employing another illustrative embodiment of a select switch responsive to a break code wherein the select switch connects an input device to one of a plurality of CPUs;

DESCRIPTION OF THE PREFERRED EMBODIMENTS

The following Description of the Preferred Embodiments first presents a general overview of the present invention, then an overview of embodiments of the invention in digital data processing systems, and finally, a detailed discussion of a preferred embodiment in a digital data processing system.

1. Overview of the Present Invention—FIG. 1

Figure 1:
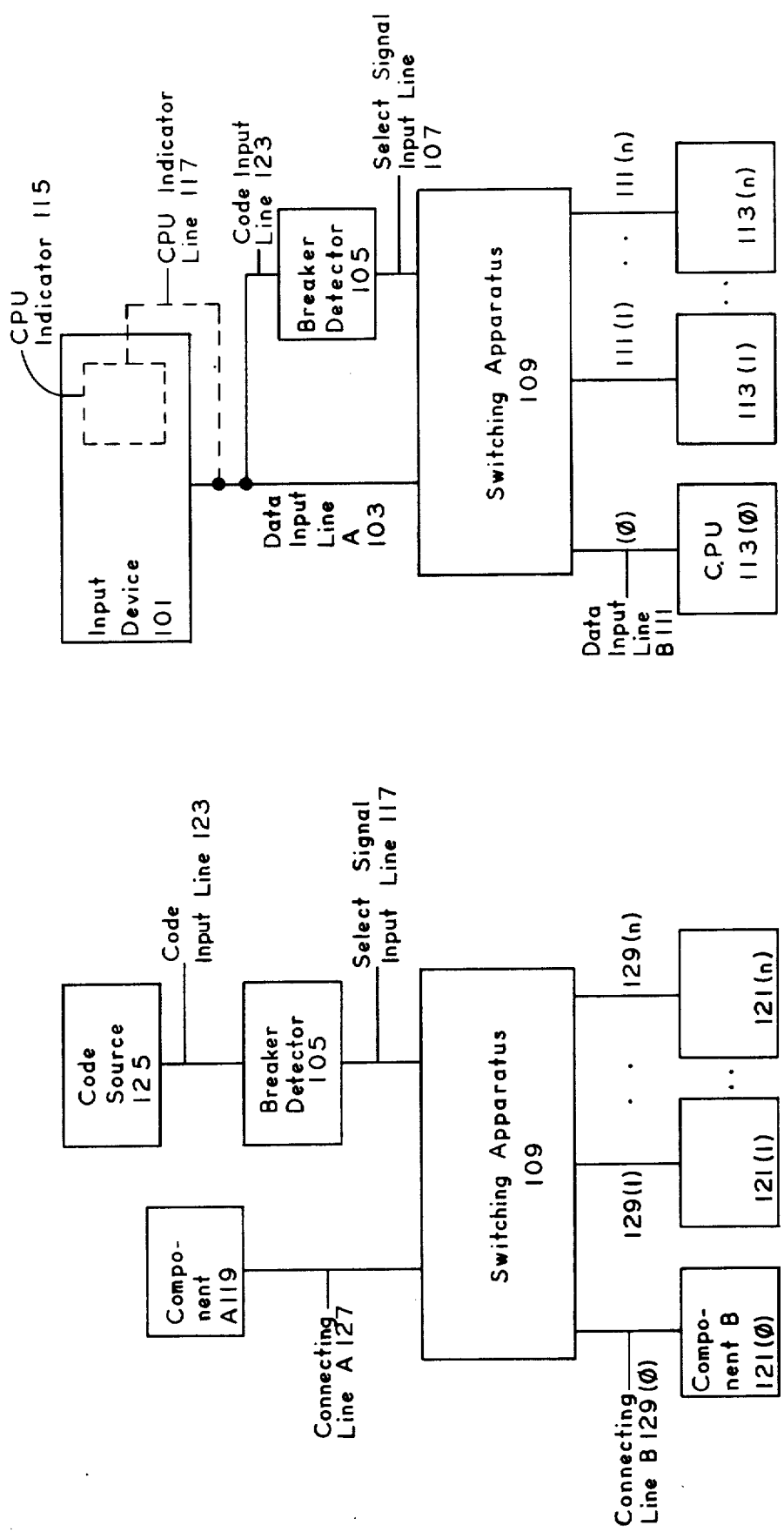
FIG. 1 is a block diagram of electrical apparatus employing an illustrative embodiment of a select switch responsive to a break code wherein the select switch connects a single component of the electrical apparatus to one of a set of components.

FIG. 1 is a general block diagram of the present invention as used in electrical apparatus to connect components of the apparatus to each other. Component A 119 is connected via Connecting Line A 127 to Switching Apparatus 109, which in turn is connected via Connecting Lines B 129(0)..(n) to Components B 121(0)..(n). Switching Apparatus 109 is further connected to Break Detector 105 via Select Signal Input Line 117, and Break Detector 105 is connected to Code Source 125 via Code Input Line 123.

The present invention operates as follows: At the beginning of operation, Component A 119 is electrically connected to a Component B 121(*a*), one of Components B 121(0)..(n), and Break Detector 105 is receiving codes from Code Source 105. When Code Source 105 provides a break code, Break Detector 105 detects the break code and provides a select signal via Select Signal Input Line 117 to Switching Apparatus 109. Switching Apparatus 109 responds to the select signal by disconnecting Component A 119 from Component B 121(*a*) and electrically connecting Component A 119 to a different Component B 121, specified here by Component B 121(*b*). In many embodiments, Component B 121(*b*) is Component B 121(*a*+1), i.e., the "next" Component B 121 of Components B 121(0)..(n). In some such embodiments, when Component B 121(*n*) is connected to Component A 112 and Switching Apparatus 109 receives a select signal, Switching Apparatus 109 "wraps around", i.e., Component B 121(0) is the "next" Component B 121.

2. The Present Invention in a Digital Computer System—FIGS. 1A and 2

In many embodiments of the present invention, Switching Apparatus 109 connects components of a digital computer system. FIG. 1A shows such an embodiment in which Switching Apparatus 109 connects an Input Device 101 with one of a group of CPUs 113(0)..(n). Input Device 101 is a means such as a terminal keyboard for inputting data codes and break codes to a CPU. Data codes and break codes are transferred via Data Input Line A 103 to Switching Apparatus 109 and one of Data Input Lines B 111(0)..(n) to one of CPUs 113(0)..(n). In this embodiment, Input Device 101 provides codes to Break Detector 105, and thus corresponds not only to Component A 119 of FIG. 1, but also to Code Source 125 of that Figure. Code Input Line 123 is accordingly connected to and receives codes from Data Input Line A 103.

In many embodiments, the present invention also includes apparatus responsive to a break code for indicating which CPU 113 has been selected. This apparatus, represented by dashed lines in FIG. 1A, includes CPU Indicator 115 in Input Device 101 and CPU Indicator Line 117 connecting CPU Indicator 115 and Data Input Line A 103. CPU Indicator 115 receives break codes from Data Input Line A 103 via CPU Indicator Line 117 and responds to the break codes by setting CPU Indicator 115 to indicate CPU 113 currently connected to Input means 101.

The embodiment of the present invention presented in FIG. 1A operates in the same manner as the embodiment of FIG. 1. When a user of Input Device 101 wishes to disconnect Input Device 101 from one CPU 113(*a*) and connect it to another CPU 113(*b*), he inputs a break code from Input Device 101, generally by striking a key on Input Device 101. The break signal is transmitted via Data Input Line A 103, and thus reaches Break Detector 105 via Code Input Line 123. Break Detector 105 responds by producing a select signal on Select Signal Input Line 107, and on receiving the select signal, Switching Apparatus 109 connects Input Device 101 to another CPU 113. The user continues inputting break codes until Switching Apparatus 109 has connected him to the desired CPU 113(*b*). In embodiments with CPU Indicator 115, CPU Indicator 115 operates in parallel with Switching Apparatus 109. At the beginning of the switching operation, it indicates that CPU 113(*a*) is currently connected to Input Device 101, and each time it receives a break code, it indicates which CPU 113 is currently connected to Input Device 101.

Figure 2:
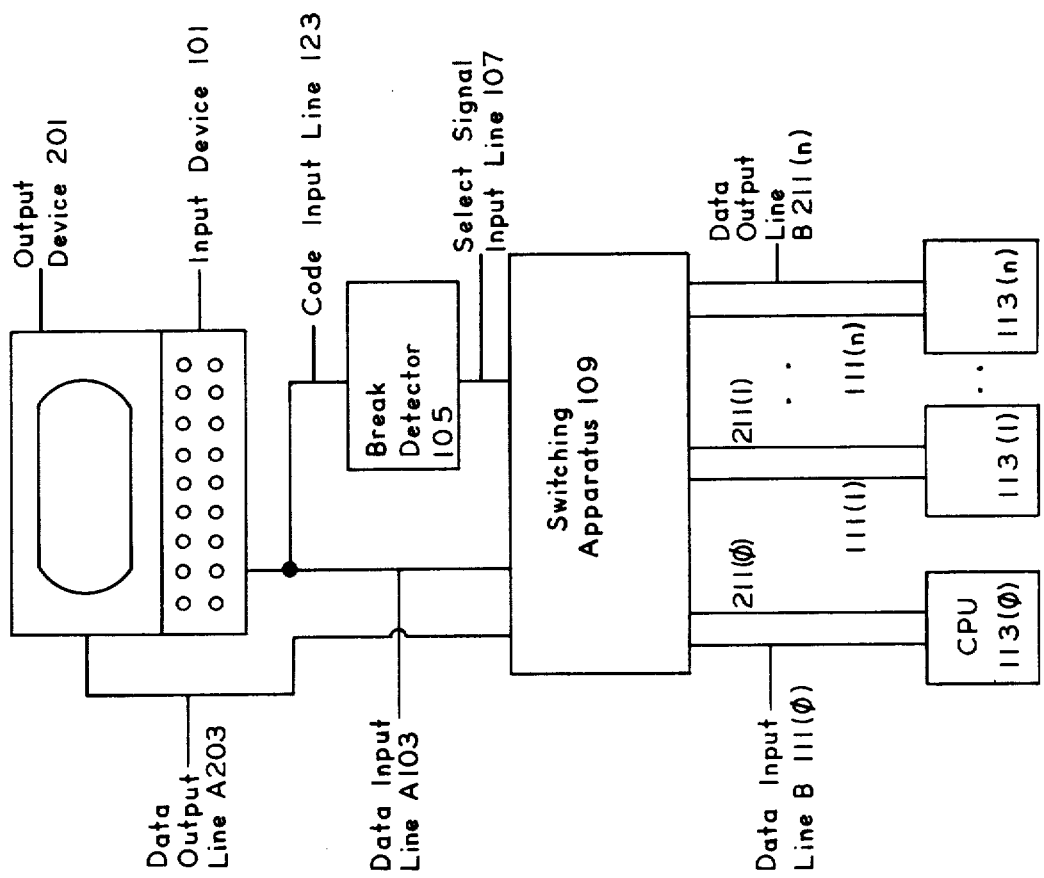
FIG. 2 is a block diagram of a second digital computer system employing another illustrative embodiment of a select switch responsive to a break code to connect an input-output device to one of a plurality of CPUs.

In most applications, CPU 113 not only receives data codes from users of the system, but also provides data codes to the users. FIG. 2 is a block diagram of an embodiment of the present invention used in such an application. Input Device 101 is now combined with Output Device 201 and Data Input Lines A 103 and B 111(0)..(n) are paired with Data Output Lines A 203 and B 211(0)..(n). Switching Apparatus 109 connects Data Input Line A 103 and Data Output Line A 203 with one pair of Data Input Line B 111(*a*) and Data Output Line B 211(*a*). Operation of the embodiment of FIG. 2 is similar to that of FIG. 1A. When a user produces a break code at Input Device 101, it is detected by Break Detector 105, which provides a select signal to Switching Apparatus 109. In response to the select signal, Switching Apparatus 109 disconnects Data Input Line A 103 and Data Output Line A 203 from Data Input Line B 111(*a*) and Data Output Line B 211(*a*) and connects the former pair of lines to Data Input Line B 111(*b*) and Data Output Line B 211(*b*).

In other applications in which CPU 113 both receives and provides data codes, there may be only a single data transmission line connecting Input Device 101 and Output Device 201 to Switching Apparatus 109 and only a single data transmission line connecting each CPU 113 to Switching Apparatus 109, and the single data transmission lines may be used alternatively for input and output. In such applications, the relationship between the data transmission lines is the same as the one represented in FIG. 1A, and the manner of operation of the invention is the same as described in the discussion of that Figure.

3. Break Signal Detection in Systems Employing Fixed-length Digital Data Codes—FIG. 3

The means employed in Break Detector 105 to detect a break code depend on the representation of a break code and the relationship between its representation and that of data codes. In most present-day computer systems, data codes sent to and received from terminals are digital codes composed of digital character codes such as those defined in the ASCII or EBCDIC character code sets plus additional codes for delimiting the character codes and for error correction. In the following discussion, a digital code made up of a digital character code plus the above mentioned additional codes is termed a transmission code.

A Data Input Line A 103 or Data Input Line B 111(*a*) in a computer system using digital codes has two states, and must specify three conditions using these two states:
* Input Device 101 not sending codes.
* Input Device 101 sending transmission codes.
* Input Device 101 sending a break code.

Figure 3:
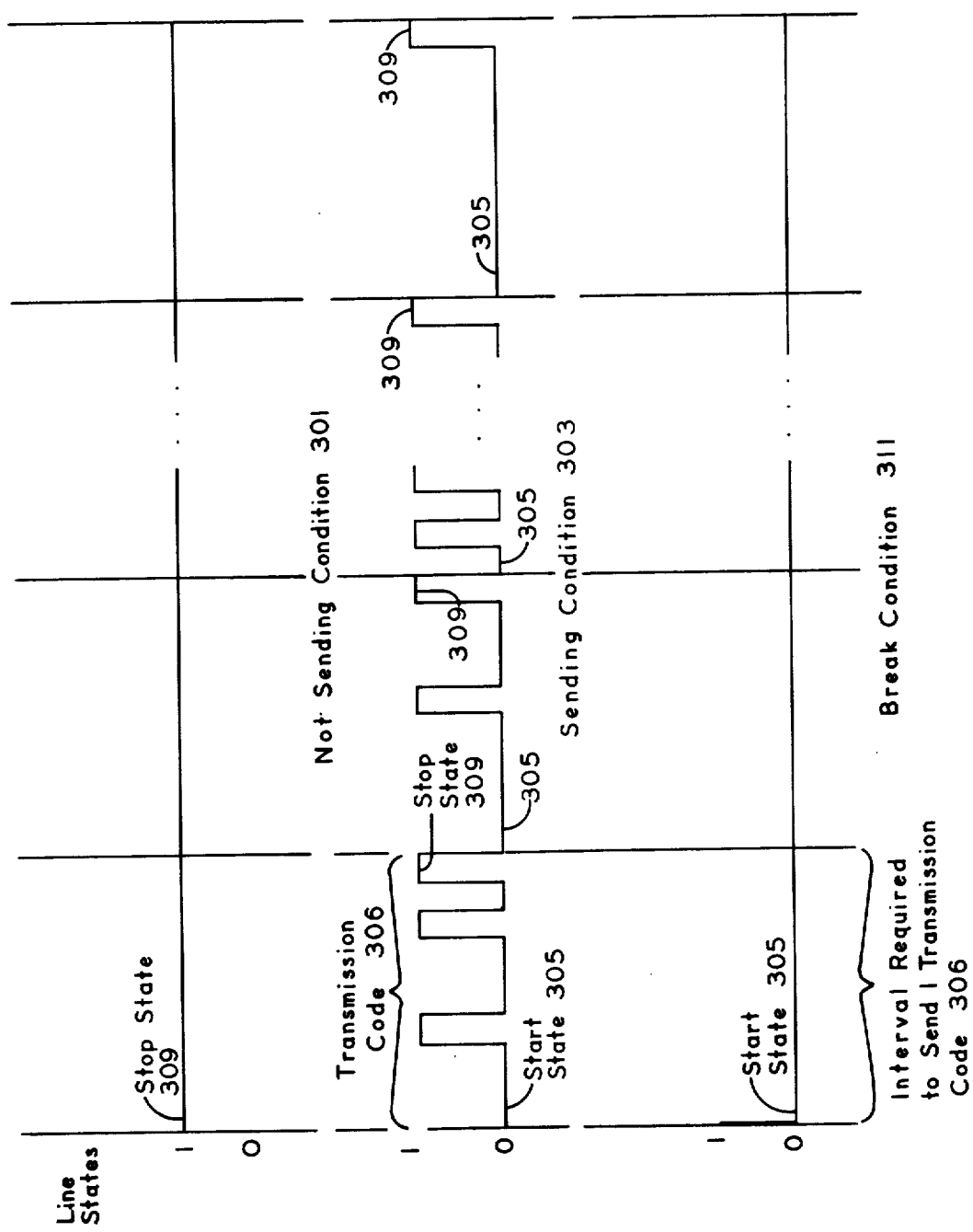
FIG. 3 presents conditions on a code input line in the select switch of the present invention.

FIG. 3 shows how Data Input Line A 103 and Data Input Line B 111(i a) specify these conditions. The two states on Data Input Line A 103 or Data Input Line B 111(*a*) are represented by states 0 and 1. Not Sending Condition 301 shows that when these lines are not transmitting digital codes, they remain in state 1. Sending Condition 303 shows that when Input Device 101 is sending transmission codes, data input lines connected to it are alternately in state 1 and state 0. Each Transmission Code 306 begins with Start State 305, contains a sequence of states including a digital character code, and ends with Stop State 309, which is the opposite of Start State 305. Start State 305 and Stop State 309 guarantee that both state 1 and state 0 occur at least once each time a Transmission Code 206 is sent. Further, since all Transmission Codes 206 are the same length and require the same time to be sent, the maximum interval between two states 1 or two states 0 in Sending Condition 303 is the length of time required to send one Transmission Code 306. Break Condition 311, finally, shows that when a break code is input to Input Device 101, lines connected to it carry a break code consisting of a sequence of 0 states which is longer than one Transmission Code 306.

Since a break code is a sequence of 0 states which is longer than one Transmission Code 306, a break code may be detected by calculating the length of a sequence of 0 states, beginning with the first 0 state in the sequence. If the length exceeds that of one Transmission Code 306, a break code has been transmitted. In some embodiments, the length may be calculated by counting the number of states in the sequence; in others, as will be explained in more detail below, the length may be calculated by measuring the time between occurrences of state 1. If that time exceeds the time required to send one Transmission Code 306, a break code has been sent.

4. Detailed Interconnection and Operation of a Preferred Embodiment—FIG. 4

Figure 4:
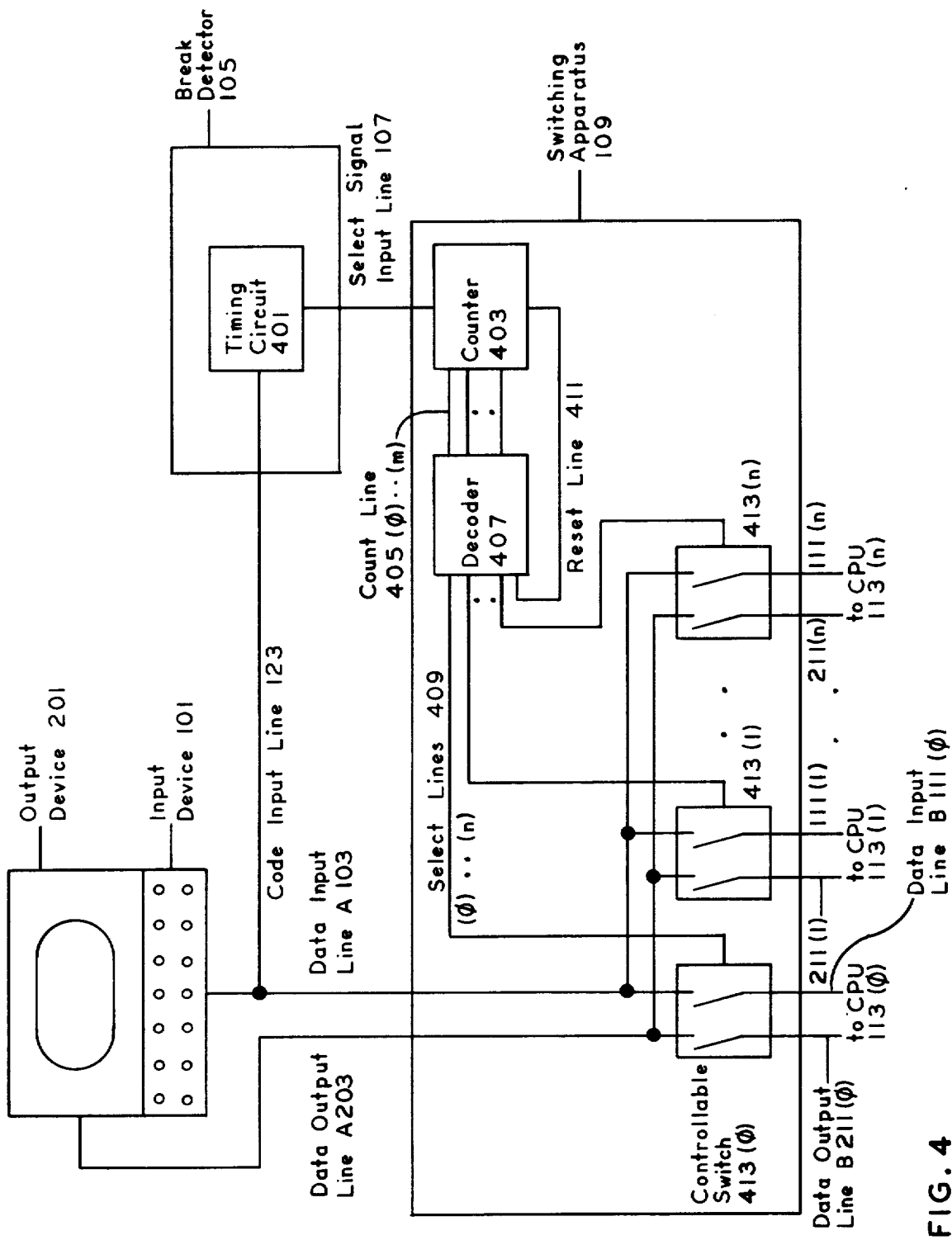
FIG. 4 presents a preferred embodiment of the switch apparatus of the present invention.

FIG. 4 presents a detailed representation of Break Detector 105 and Switching Apparatus 109 in a preferred embodiment of the invention. The preferred embodiment of FIG. 4 is in a system of the type presented in FIG. 2: A CPU 113($a$) (not shown) receives digital data codes and break codes from Input Device 201 via Data Input Line A 103 and Data Input Line B 111($a$) associated with it, and provides data codes and break codes to Output Device 201 via Data Output Line B 211($a$) and Data Output Line A 203. When Break Detector 105 detects a break code, it provides a select signal via Select Signal Input Line 107 to Switching Apparatus 109, which connects Data Input Line A 103 to Data Input Line B 111($a+1$) and Data Output Line B 203 to Data Output Line B 211($a+1$). In the preferred embodiment of FIG. 4, Break Detector 105 includes Timing Circuit 401, which is connected by means of Code Input Line 123 to Data Input Line A 103 and by means of Select Signal Input Line 107 to Switching Apparatus 109.

Timing Circuit 401 starts running anew each time a transition from state 1 to state 0 occurs on Code Input Line 123; each time a transition from state 0 to state 1 occurs, Timing Circuit 401 stops running. If Timing Circuit 401 runs without being stopped for a time equal to that required to send a transmission code, Timing Circuit 401 provides a select signal to Select Signal Input Line 107 and stops. Since the only codes in which a transition from state 0 to state 1 does not occur in the length of time required to send a transmission code are break codes, Timing Circuit 401 provides a select signal only when Data Input Line A 103 transmits a break code.

Switching Apparatus 109 includes Counter 403, Decoder 407, and Controllable Switches 413(0)..(n). Counter 403, connected to Select Signal Input Line 107 and Reset Line 411, increments a binary value each time it receives a select signal on Select Signal Input Line 107 and is reset to 0 by a reset signal on Reset Line 411. Counter 403 provides the current binary value via Count Lines 405(0)..(m) to Decoder 407, which in turn has connected to it Select Lines 409(0)..(n) and Reset Line 411. There are as many Select Lines 409 as there are CPUs 113, and Select Line 409($a$) corresponds to CPU 113($a$). Only one Select Line 409 is active at a time. Which one is active is determined by the current value of Counter 403. If Counter 403's current value is a, then Select Line 409($a$) is active. If Counter 403's current value reaches $n+1$, then Reset Line 411 becomes active, Counter 403 is reset to 0, and Select Line 409(0) becomes active.

Each Select Line 409 is connected to and controls one of Controllable Switches 413(0..n). When a Select Line 409($a$) is active, then its Controllable Switch 413($a$) is on; otherwise, Controllable Switch 413($a$) is off. Each Controllable Switch 413($a$) is further connected to Data Input Line A 103 and Data Output Line A 203 and to Data Input Line B 111($a$) and Data Output Line B 211($a$). When Controllable Switch 413($a$) is on, it connects Data Input Line A 103 to Data Input Line B 111($a$) and Data Output Line A 203 to Data Output Line B 211($a$), thereby connecting Input Device 101 and Output Device 201 to CPU 113($a$). In the present embodiment, Counter 403 is a 7493 four-bit binary counter, Decoder 407 is a 7445 binary to decimal decoder, and Controllable Switches 413 are 5-volt reed relays.

The preferred embodiment of FIG. 4 operates as follows: at the beginning of operation, Data Input Line A 103 and Data Output Line A 203 are connected to CPU 113($a$), one of CPUs 113(0)..(n) via Data Input Line B 111($a$) and Data Output Line B 211($a$). Controllable Switch 413($a$) is on, Select Line 409($a$) is active, and Counter 403 contains the value a. The user at Data Input Device 101 then presses the break key, thereby generating a break code on Data Input Line A 103 and Code Input Line 123. When Timing Circuit 401 detects the break code, it generates a select signal on Select Signal Input Line 107; in response to the select signal, Counter 403 increments its count value from a to $a+1$. Select Line 409($a$) thereupon becomes inactive, turning Controllable Switch 413($a$) off, while Select Line 409($a+1$) becomes active, turning Controllable Switch 413($a+1$) on. Controllable Switch 413($a+1$) connects Data Input Line B 111($a+1$) to Data Input Line A 103 and Data Output Line B 211($a+1$) to Data Output Line A 203, thereby connecting CPU 113($a+1$) to Input Device 101 and Output Device 201.

5. Detailed Interconnection and Operation of Timing Circuit 401—FIG. 5

Figure 5:
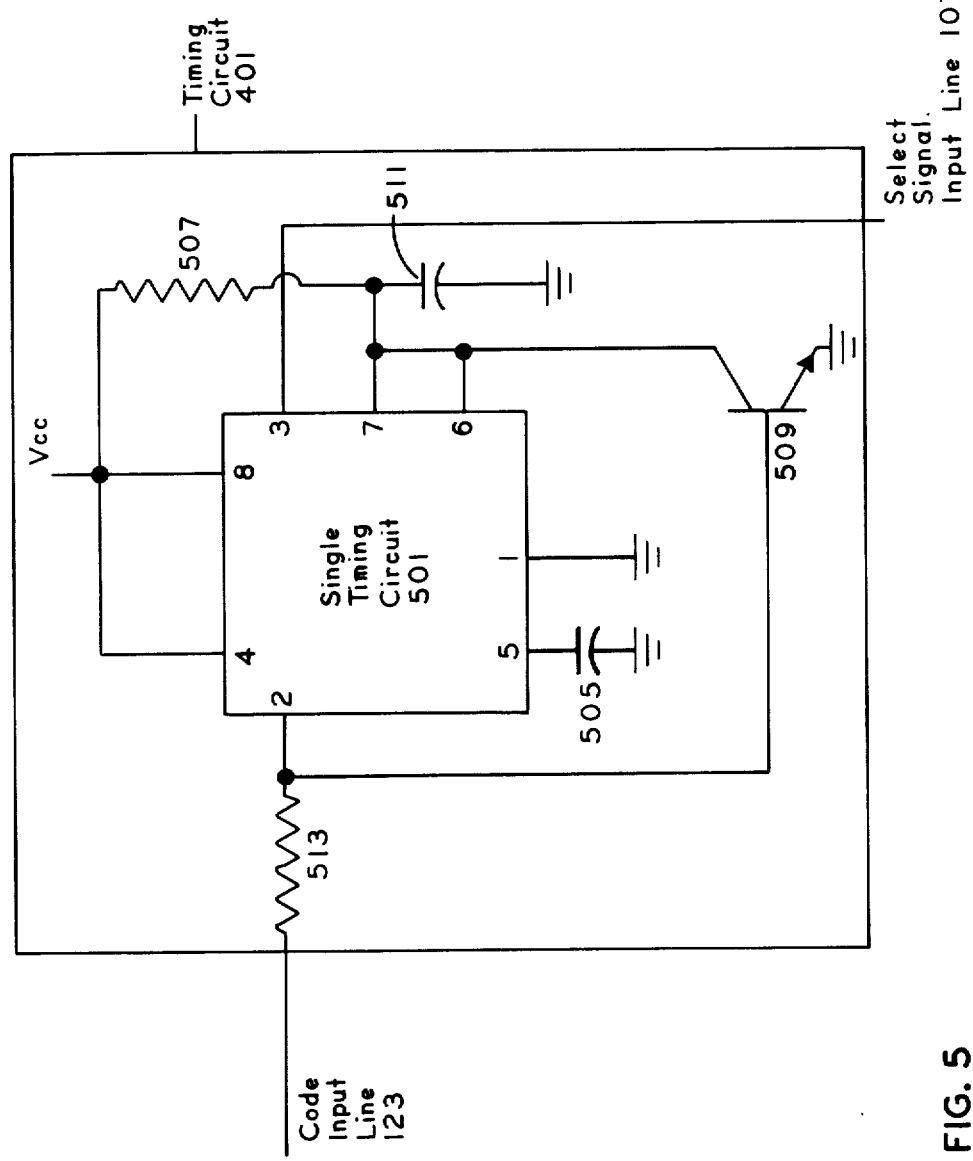
FIG. 5 is a detailed representation of the timing circuit of the preferred embodiment of FIG. 4.

Timing Circuit 401 in the preferred embodiment of FIG. 4 is implemented using an NE555P Single Timing Circuit or its equivalent. The mode of implementation is shown in FIG. 5. Single Timing Circuit 501 has eight leads, connected as follows:

* Leads 1 and 5 are connected to ground;
* Lead 2 is connected to Code Input Line 123;
* Leads 4 and 8 are connected to Vcc;
* Lead 3 is connected to Select Signal Input Line 107;
* Leads 6 and 7 are connected to the output of Resistor 507, the input of Capacitor 511, and the collector of Transistor 509.

When Single Timing Circuit 501 is off, i.e., not timing, lead 7 provides a path to ground internal to Single Timing Circuit 501. Consequently, Capacitor 511 remains discharged. Single Timing Circuit 501 begins timing when it receives a negative-going trigger pulse on lead 2. In response to the negative-going pulse on lead 2, lead 7 ceases conducting and Capacitor 511 begins charging. The voltage drop across Capacitor 511 determines the voltage at lead 6. When that voltage exceeds a control voltage, a pulse is produced at lead 3 and lead 7 again conducts, discharging Capacitor 511. The sizes of Resistor 507 and Capacitor 511 determine the speed with which Capacitor 511 charges, and thereby the period of time before a pulse is produced at lead 3. Leads 4 and 5 do not affect the operation of Single Timing Circuit 501 in this application. Lead 4 may receive a reset pulse resetting Single Timing Circuit 501, but is tied to Vcc and hence inactive in this application. Lead 5 is at the control voltage mentioned above. Capacitor 505 on lead 5 serves merely to stabilize the control voltage.

In Timing Circuit 401, the behavior of Single Timing Circuit 501 described above is modified by Transistor 509. Transistor 509 is an NPN transistor having its collector connected to leads 6 and 7, its emitter connected to ground, and its base connected to lead 2. When voltage at lead 2 is positive, current flows through Transistor 509 from collector to emitter and Capacitor 511 discharges through Transistor 509. Thus, as long as positive voltages occur at lead 2 at intervals shorter than that required to charge Capacitor 511 to the point where the voltage at lead 6 exceeds the control voltage, Capacitor 511's timing cycle is restarted over and over again and a pulse is not produced on lead 3.

In the preferred embodiment of FIG. 4, Timing Circuit 401 detects break codes as follows: On Data Input Line A 103, state 1 is a positive voltage and State 0 a negative voltage or 0. Consequently, a transition from state 1 to state 0 on Data Input Line A 103 produces a negative-going trigger pulse on Code Input Line 123 and causes Single Timing Circuit 501 to commence operation. Capacitor 511 begins charging as described above. However, each time Data Input Line A 103 returns to state 1, Code Input Line 123 is at a positive voltage and Transistor 509 conducts, discharging Capacitor 511. Capacitor 511 begins charging again on the next occurrence of state 0 on Data Input Line 103 and continues charging until the next occurrence of state 1 on that line or until the voltage at lead 6 exceeds the control voltage. If the values of Resistor 507 and Capacitor 511 are chosen so that the time required to charge Capacitor 511 until the voltage at lead 6 exceeds the control voltage is the same as the time required to send one Transmission Code 306, then Timing Circuit 401 functions as a break detector, providing a pulse to lead 3 and thereby to Select Signal Input Line 107 only when a break code appears on Data Input Line A 103. In the present embodiment, the resistors and capacitors in Timing Circuit 401 have the following values:

* Resistor 513: 10K ohm
* Resistor 507: 1K ohm
* Capacitor 511: 47 microfarad
* Capacitor 505: 0.01 microfarad Since the values of Resistor 507 and Capacitor 511 depend on the length of time required to send a transmission code and on internal characteristics of Single Timing Circuit 501, other embodiments may have other values for these parts.

6. Detailed Interconnection and Operation of CPU Indicator 115—FIG. 6

Figure 6:
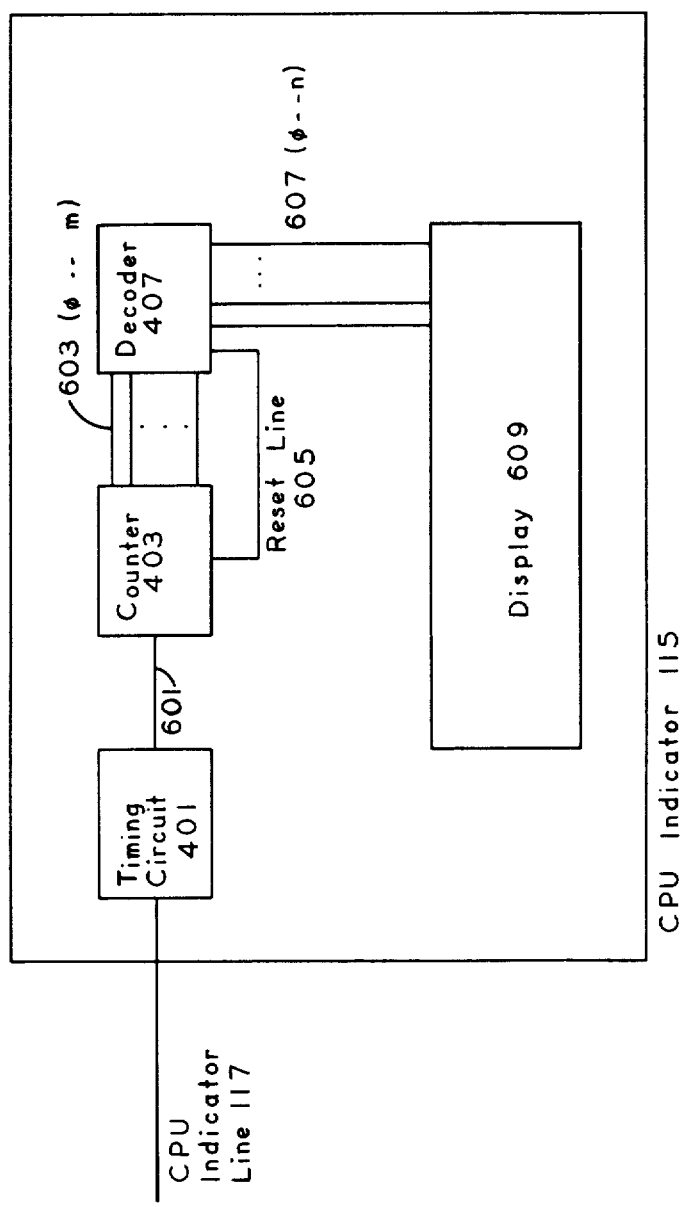
FIG. 6 presents a preferred embodiment of the CPU indicator of the present invention.

Turning finally to FIG. 6. there is represented a preferred embodiment of CPU Indicator 115. The components of CPU Indicator 115 include a Timing Circuit 401, connected to CPU Indicator Line 117, which, as seen in FIG. 1A, is in turn connected to Data Input Line A 103, a line 601 carrying a select signal to a Counter 403, lines 603(0..m) providing an encoded value from Counter 403 to a Decoder 407, a Reset Line 605 from Decoder 407 to Counter 403, and Display Activation Lines 607(0)..(n) corresponding to CPUs 113(0)..(n) for activating Display 609. Counter 403 in CPU Indicator 115 is set to the same value as Counter 403 in Switching Apparatus 109 at the beginning of the operation of the invention. With the exception of Display 609, the components of CPU Indicator 115 are the same as those of Break Detector 105 and Switching Apparatus 109, and the components function in the same fashion: when Timing Circuit 401 detects a break code, it provides a select signal via Line 601 to Counter 403, which in turn increments the value it contains. Counter 403 provides the encoded value to Decoder 407, which activates one of Display Activation Lines 607(0)..(n). Responding to the activated line, Display 609 displays a value, and since Counter 403 always has the same value as Counter 403 in Switching Apparatus 109, if CPU 113(a) is connected to Input Device 101, Display 609 displays the value a.

The invention may be implemented by those skilled in the art in fashions other than those just described. In particular, alternate embodiments may be constructed which detect break codes in a system in which state 1 is a low voltage and state 0 a high voltage. Such an embodiment may be constructed by replacing Transistor 509 with its pnp equivalent. Other alternate embodiments may employ tri-state drivers as Controllable Switches 413 instead of relays. Finally, alternate embodiments may be constructed using integrated circuits which combine the devices contained in Break Detector 105 and Switching Apparatus 109 in various fashions.

Other alternate embodiments may include the following: Timing Circuit 401 in CPU Indicator 115 may be omitted and Counter 403 connected to Select Signal Input Line 107; further, Counter 403, Decoder 407, and their related conductors may be omitted in CPU Indicator 115 and Display 609 may be connected to Select Lines 409. The display provided by Display 609 may take many forms. It may be a set of lamps, each lamp corresponding to one CPU 113, or it may be one of many digital display devices.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In electrical apparatus including
   (1) a first component having means for generating digital codes, said digital codes consisting of sequences of states including a first state and a second state and including
      (a) transmission codes having a uniform length and consisting of at least one first state and at least one second state, and
      (b) break codes consisting only of said second state and having a length equal to said uniform length, and
   (2) a plurality of other components,
   selection means responsive to said break codes for electrically connecting said first component with a selected one of said plurality of other components, said selection means comprising:
      (1) means, connected to said means for generating digital codes, for detecting said break codes in said digital codes, said break code detection means including means for determining the length of each said sequence of consecutive second states and means for generating a select signal on each occurrence of a sequence of said second states which is at least equal to said uniform length; and (2) switching means responsive to said select signal for electrically connecting said first component with a selected one of said other components, said switching means including:
   (a) a plurality of controllable switching means, each one of said plurality of controllable switching means being associated with and connected to a corresponding component of said plurality of other components,
   (b) a plurality of select lines, each one of said select lines being associated with and connected to a corresponding one of said controllable switch means,
   (c) resettable counting means connected to said break code detector, to a reset line, and to a plurality of count lines, said resettable counting means including means for incrementing an encoded value in response to said select signal, means for outputting said encoded value on said plurality of count lines, and means for responding to one said reset signal by resetting said encoded value to a preset value, and
   (d) decoding means connected to said plurality of count lines, to said plurality of select lines, and to said reset line and responsive to said encoded value, said decoding means including means for providing a signal to the one select line corresponding to said encoded value, means for removing the signal from the one select line corresponding to the previous encoded value, and means for providing said reset signal on said reset line when said encoded value exceeds a present value.

2. The selection means of claim 1, and wherein:
the transmission of any said transmission code requires a uniform length of time; and
said means for generating a select signal includes
   (i) interval timing means;
   (ii) means for detecting a transition from said second state to said first state;
   (iii) means for detecting a transition from said first state to said second state;
   (iv) means responsive to said first state to said second state transition detecting means for activating said timing means when a transition from said first state to said second state is detected;
   (v) means responsive to said second state to first state transition detecting means for resetting said timing means when a transition from said second state to said first state is detected; and
   (vi) means, responsive to said internal timing means, for generating said select signal if said detecting means does not detect a transition from said second state to said first state within a period of time equal to said uniform length of time.

3. The selection means of claim 1 wherein:
the transmission of each transmission code requires a fixed and uniform length of time; and
said select signal generating means includes interval timing means for measuring the elapsed time since the previous transition in said coded information from said first level to said second level.

4. In the selection means of claim 3 wherein said select signal generating means further includes
means for activating said timing means in response to each transition in said coded information from said first level to said second level, and
means for resetting said timing means in response to each transition in said coded data stream from said second level to said first level.

* * * * *